Feb. 19, 1952     S. C. COLLINS     2,586,207
ACCUMULATOR
Filed Jan. 20, 1948     2 SHEETS—SHEET 1
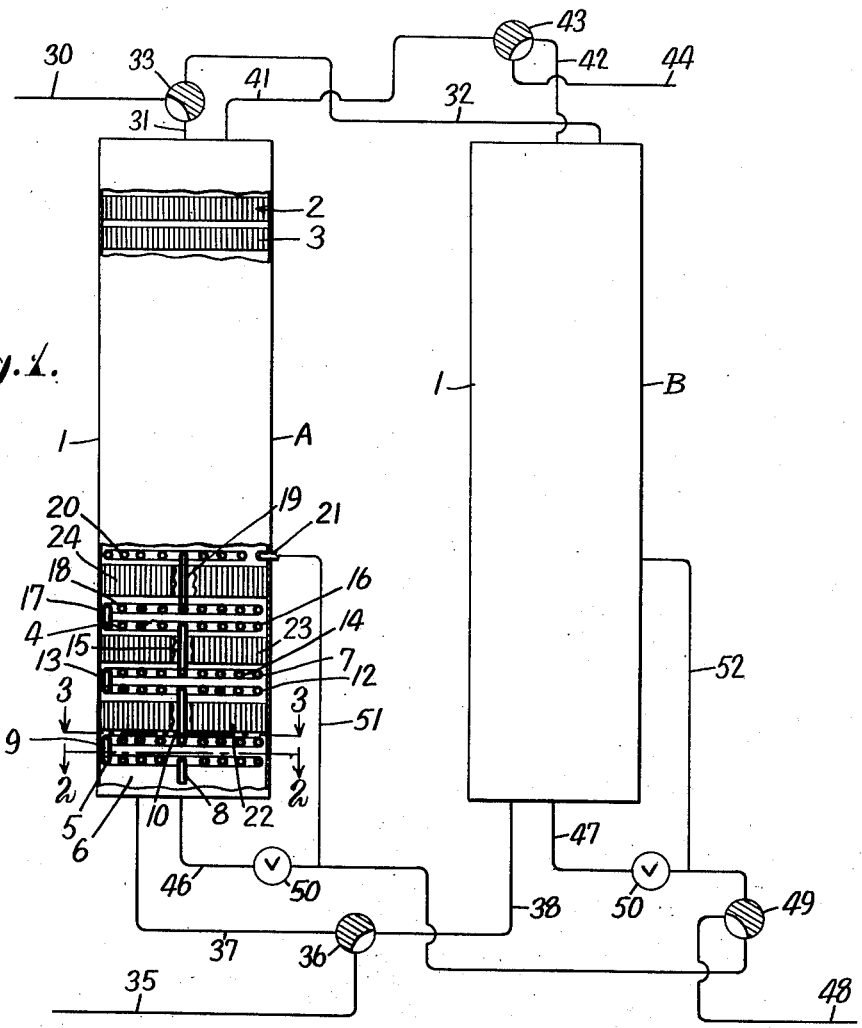
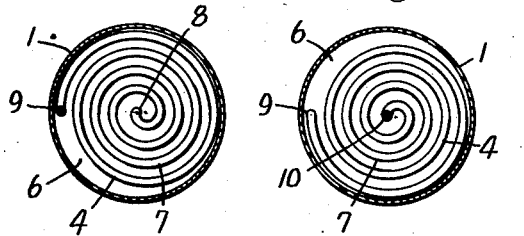
Inventor:
Samuel C. Collins.

Feb. 19, 1952  S. C. COLLINS  2,586,207
ACCUMULATOR
Filed Jan. 20, 1948  2 SHEETS—SHEET 2
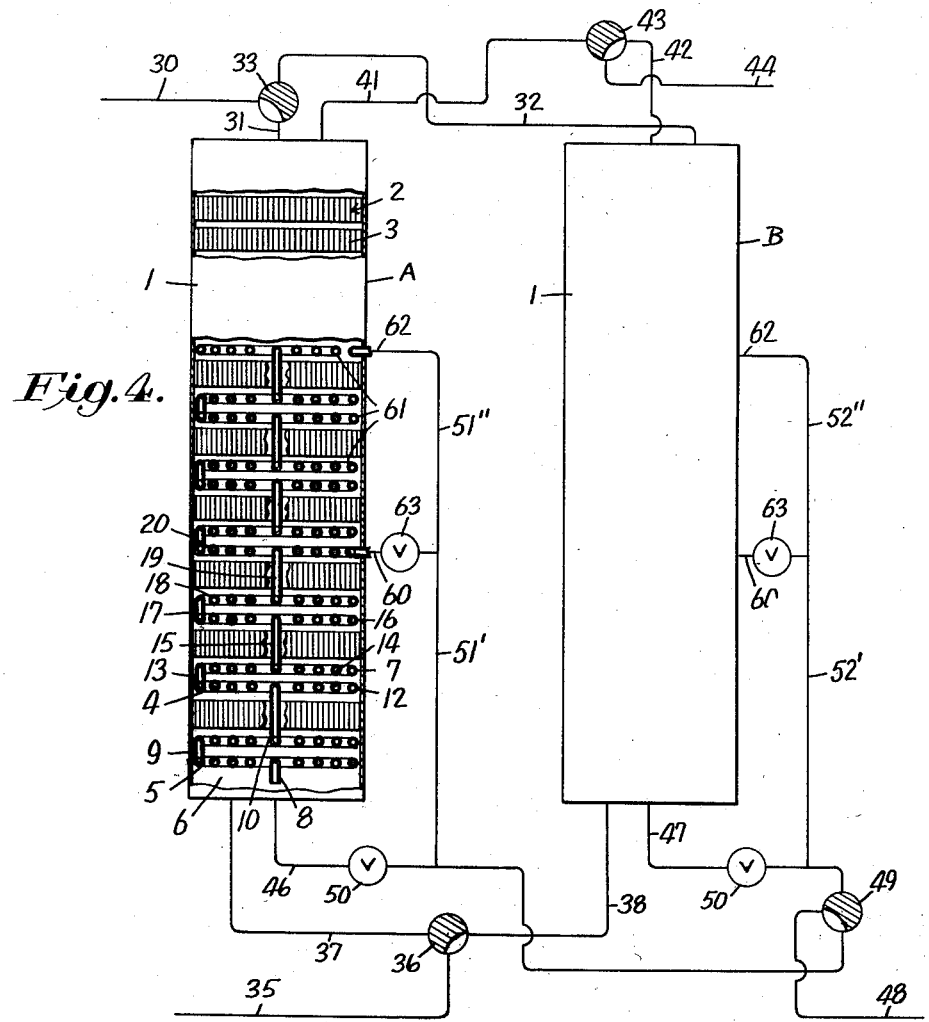
Inventor:
Samuel C. Collins.
by Louis A. Maxam
atty.

Patented Feb. 19, 1952

2,586,207

UNITED STATES PATENT OFFICE 2,586,207

ACCUMULATOR

Samuel Cornette Collins, Watertown, Mass., assignor to Joy Manufacturing Company, Pittsburgh, Pa., a corporation of Pennsylvania Application January 20, 1948, Serial No. 3,218

3 Claims. (Cl. 62—122)

My invention relates to accumulators and particularly to accumulators for use in processes and apparatus for separating gases.

Technical plants for separating gases are usually worked continuously. For weeks at a time there may be a steady flow of gas maintained in the plant, and the entering material and the products of separation will leave the apparatus at constant velocity, temperature and composition throughout these periods of operation. The time required to produce this stationary state is relatively small compared with the period through which the state is maintained.

In plants of the kind mentioned, the gases are separated at temperatures considerably lower than that of the surroundings, and accordingly the entering warm gas must be cooled before entering the separating unit, for example, a rectifying column. The separated products ordinarily emerge from the separating unit as cold vapors or even as liquids, but they are mostly required at room temprature, and it is, therefore, logical to utilize the cold outgoing products to precool the entering warm mixture. In the gases to be separated, there are, moreover, frequently constituents which need to be removed before they attain to the actual separating unit, among these being water vapor and carbon dioxide, in the case of air. An apparatus well adapted for both of the functions mentioned is the accumulator. This is an apparatus in which heat, or cold, is removed from a stream of gas and stored on the walls of a single-stream conduit during one half cycle and dispensed to a stream of gas flowing in the opposite direction during the second half cycle. If one of the streams is air and the other nitrogen, it will be evident that water vapor and carbon dioxide may be condensed out on the walls of the accumulator as the air flows through the latter, and that these deposits can be sublimed and carried out by the nitrogen as the latter flows through the accumulator. By the use of two reversing accumulators, through one of which a cold separated constituent may be discharged to effect cooling down of the accumulator, while through the other the entering mixture is flowing in the opposite direction while being cooled down and having water vapor and carbon dioxide condensed from it, very desirable results may be obtained.

In conventional accumulators the cold is stored in a mass of metal of high heat capacity through which cold gas has passed, and when the cold gas is diverted to another channel (in another accumulator), and the first accumulator is traversed by a warm current of entering material, this entering material will be cooled to the low temperature required, and any accompanying water vapor and carbon dioxide (and possibly other impurities) will be removed, provided, the accumulator is of adequate capacity and efficiency.

Conventional cold accumulators are usually vertical lagged towers filled with many spirally wound strips of corrugated aluminum sheets packed one above another. The cold product of rectification is admitted to the tower from one end, and, after the current has been shut off, the warm entering mixture enters from the opposite end. The tower is thus traversed alternately by two currents of gas in opposite directions, and, as previously indicated, two accumulators are employed in such a manner that while the warm, entering gaseous material is traversing one of them the cold separated gaseous product passes out through the other. The currents are commonly regulated by an automatic valve which reverses them at frequent intervals, these intervals varying with the various conditions, and often being on the order of two minutes. If a cold and a warmed current of gas are alternately passed through an accumulator for periods of a few minutes, a stationary state is reached after a few hours, and very small temperature heads can be maintained between the ingoing gas at one period and the outgoing gas in the next, without making the accumulator towers too large and heavy.

The use of adequate accumulators permits all appliances for drying the entering gaseous material before it enters the plant, and for removing small quantities of carbon dioxide, to be dispensed with, because ice and solid carbon dioxide are deposited on the packings of the accumulators when these are adequately constructed, so that they can not reach the separating unit. In the cold periods most of this layer of ice and solid $CO_2$ is removed by sublimation, so that the accumulators can work for week before becoming clogged. Despite the great advantages possessed by accumulators employed in the manner mentioned, there are factors which limit their use, as they are ordinarily constructed. They must normally be of considerable height, in order effectually to remove the water vapor and carbon dioxide, and where apparatus of relatively small overall height is desired, the conventional accumulator may not be suitable. Moreover, the portion of the carbon dioxide precipitated would be precipitated near the cold end of the accumulator where it is hard to remove. Another factor that affects the utility of accumulators in the separation of air into its constituents is that the air is normally delivered to the apparatus under substantial pressure, and the air has a higher specific heat when it is compressed, and accordingly where reliance is placed on the leaving separated nitrogen constituent to cool the entering air and precipitate out of the water vapor and carbon dioxide, there may be an inadequate amount of cold furnished by the leaving nitrogen. The result is that the compressed air is not cooled to a temperature low enough to effect complete condensation of the carbon dioxide.

Accordingly, I have provided in this present invention an improved accumulator construction by which through a repassing of a portion of the cooled entering air (where air is the gas to be separated) all the carbon dioxide may be removed, and the carbon dioxide will be precipitated more uniformly throughout the accumulator and not largely at the cold end of the latter from which it would be hard to remove.

To improve the accumulators and their performance I provide, according to the present invention, means for recirculating at least a portion of the cooled compressed air within the interior of the accumulators, desirably providing means for taking a part of the air from the cold end of each accumulator and passing it through a coil or the like and discharging it, at a point along the length of the accumulator to rejoin the rest of the air. In a refined form of the invention the recirculated portion of the air may be discharged at a plurality of points along the length of the accumulators, a portion of this recirculated portion being released, say, a third of the way from the cold end, and another portion, say, sixty percent of the way from that end; and if the circumstances warrant the additional complexity, discharges at a considerable number of points between the cold end and the hot end may be provided. Desirably, the amount to be recirculated may be governed by the provision of restrictor valves or other appropriate arrangements at the several outlets or at part of them.

An object of the present invention is the provision of an improved apparatus for separating impurities out of an entering stream of gaseous material on its way to a separating apparatus. Another object of the invention is the provision of an improved accumulator. A further object of the invention is the provision of an improved accumulator system. Still another object of the invention is the provision of an improved accumulator having in addition to cold storing means, means for effecting a circulation through its interior of a portion of the gases which have been cooled and purified therein, for the purpose of more effectively separating out the impurities, and enabling their more complete sublimation and removal. Still another object of the invention is the provision of an improved accumulator structure having therein suitable cold storing apparatus, and also having therein an improved heat exchanger. Still another object of the invention is the provision of an improved accumulator having associated therewith, and having as a portion thereof, improved internal means for circulating through its interior a portion of the gaseous mixture admitted thereto for cooling and purification, to improve the performance thereof. Other objects and advantages of the invention will hereinafter more fully appear.

In the accompanying drawings in which two forms which my invention may assume in practice are shown for purposes of illustration:

Fig. 1 is an improved accumulator system, shown more or less diagrammatically, and with parts broken away, to illustrate the system and the accumulator structure per se.

Fig. 2 is a horizontal section on the plane of the line 2—2 of Fig. 1.

Fig. 3 is a similar view on the plane of the section line 3—3 of Fig. 1.

Fig. 4 is a view generally similar to Fig. 1, showing a further and more refined modification of the invention.

Referring to the drawings and first to Figs. 1 to 3 thereof, it will be observed that I have shown two accumulators, A and B. Each of these accumulators is in the form of a column having a casing 1 (normally suitably lagged) in which there is arranged a suitable metallic packing of high heat capacity 2. As shown, this packing will be observed to consist of a considerable number of spirally wound strips 3 of corrugated aluminum sheet, packed one above the other. In the uppermost part of the column, these may be superimposed directly one on the other or separated a short distance by radial rods not shown. But in the lower portion of the column, perhaps, but not limited thereto, the lower 40%, these packing elements are not directly superimposed one on the other, but are spaced from each other and also spaced from the bottom of the column; and a metal tubing 4 is arranged with a portion 5 thereof substantially in the very bottom of the chamber 6 of the column, and has convolutions 7 thereof arranged at progressively higher levels between spirally wound sections 3 of the aluminum strips. The tubing 4 has an opening or inlet connection 8 at its bottom, and is then loosely coiled spirally until its diameter approximately equals the diameter of the chamber 6. A short riser section 9 then extends up to another spiral section from whose center a further riser section 10 extends up to a lower spiral 12 connected by a riser 13 with a further spiral 14. A riser 15 connects the center portion of the spiral portion 14 with the lower spiral 16 of a further double coil arrangement which has a riser section 17 connected to an upper spiral 18, and the latter, through a riser 19, is connected to a spiral 20 from which an end emerges at 21 through the casing 1 of the accumulator A. It will be observed that there are sections of the aluminum packing shown at 22, 23 and 24 in between certain of the spiral sections of the coil. The arrangement is but illustrative of suitable interspacing. The accumulator B is constructed essentially similarly to the accumulator A. Gaseous material on its way to a separating system—herein, for purposes of illustration, to be regarded as air—is adapted to be supplied to a primary supply conduit 30 and thence to the top of both of the accumulators, but only in alternation. It will be observed that a branch 31 leads to the top of the accumulator A, and another branch 32 leads to the top of the accumulator B, and a valve device 33 is adapted to connect the conduit 30 alternatively with the conduits 31 and 32. A cold gas, herein the nitrogen constituent of separated air, is adapted to be passed through the accumulators in turn, and to be supplied through a conduit 35 which may be connected through a valve device 36 alternatively with conduits 37 and 38 leading into the bottoms of the chambers 6 of the two accumulators. This nitrogen, after absorbing much of the heat given up by the entering air, is adapted to pass from the tops of the accumulators through conduits 41 and 42, through which one depending upon which of the accumulators is being cooled down, and a valve 43 is provided to connect the conduits 41 and 42 alternatively with the discharge line 44 for the nitrogen. Passages 46 and 47 lead from the bottoms of the chambers 6, and are adapted to conduct the cooled entering air, minus certain portions thereof which are passed through the tubings 4 and other portions thereof which have been deposited out in the accumulators, to a discharge line 48, and a valve 49 is adapted to connect the conduits 46 and 47 alternatively with the discharge line 48. Each of the conduits 46 and 47 has a valve device 50 between its ends, and these may be used slightly to restrict the flow through the conduits 46 and 47, thereby to force a portion of the air from the bottom of the chambers 6 to pass into the inlet connection 8 and through the tube spirals, and out through the connection 21, and by way of connections 51 or 52 as the case may be into the lines 46 and 47 beyond the restrictor valves 50.

The mode of operation of the arrangement so far described will be readily understood. With the valves 33, 36, 43 and 49 in the positions shown in Fig. 1 the cold material—nitrogen, when the accumulators are being used in an apparatus for the separation of air into its constituents—will pass from the conduit 35 to the conduit 38 and pass through the casing of the accumulator B and will leave the latter by way of the conduit 42 and be directed by the valve 43 to the line 44, which leads to a vent. The nitrogen, since the valve 49 prevents flow through the conduits 47 and 52, will not flow through the coils in the accumulator B; and with the valve 3 3positioned as shown in Fig. 1 air will be prevented from securing access through the conduit 32 to the accumulator B. Concurrently with the cooling down of the accumulator B, relatively warm air, at substantial pressure, for example 150 pounds gauge, will enter the accumulator A by way of conduit 30, valve 33 and conduit 31. This air will pass down and give up heat to the packing 3, and will have carbon dioxide and water vapor frozen out of it and deposited on the packing. By providing the tubing within the accumulators, as described, and by conducting portions of the cooled air back through the tubing, the entering air stream may be caused to be cooled earlier in its traverse of the accumulator, to be reduced to a lower terminal temperature, and to have its impurities frozen out over a wider portion and also higher up in the accumulators. It will be noted that a portion, the amount controlled by the flow area and by the back pressure imposed by the valves 50, of the cold air will be caused to enter the open mouth 8 of the tubing and to pass up through the several spiral coils, and absorb heat from the downwardly moving stream of air, and will leave at 21 at a substantially higher temperature than subsists in the bottom of the chamber 6 and rejoin the air leaving by the conduit 46, but the raising of the temperature of the air passing to the conduit 48 will be more than offset by the increased effectiveness of the accumulators.

The provision of the valves 33, 36, 43 and 49 has been noted. These valves may desirably be automatically controlled, and various arrangements for effecting such control may be employed. It is obviously unnecessary that four individual valves be provided; and a system adapted for the effecting of the switching function is shown and described in my copending application, Ser. No. 661,253, filed April 11, 1946. With the arrangement shown in Fig. 1, the entering air, which is warm, passes from the conduit 30, through the valve 33 and conduit 31, and through the accumulator A, and then through the valve 49 and the conduit 48, which may lead to other portions of an air separating apparatus. While the air is passing through the accumulator A, nitrogen from the conduit 35 may pass through the valve 36 and the conduit 38 to the accumulator B, and from the latter through the conduit 42, valve 43 and conduit 44 to a desired point. After a short period, the position of all of the valves mentioned may be changed, as by rotating them 90° clockwise in Fig. 1, and then the air will flow from the conduit 30 through conduit 32 and accumulator B and past the valve 49 to the conduit 48, while the nitrogen at this time will pass from the conduit 35 through the valve 36 and the conduit 37 and through the accumulator A and then through the conduit 41 and the valve 43 to the conduit 44. After another short time interval, there will be a reswitching to the first mentioned flows, and these changes in positions of the valves, and the switchings of the flows, as described may take place at intervals of a couple of minutes, or whatever else may be found to be suitable periods of time.

When the additional complication and expense of construction warrant it, still more effective operation may be secured by the arrangement shown in Fig. 4. Here it will be observed that the coils for reverse flow of air may be extended substantially two-thirds of the way up the casing, and a graded cooling effect is accomplished by having a predetermined volume of flow through the lower portion of the column and a lesser flow through the next higher section. Thus some additional cooling can be effected relatively early in the path of the air, and more intensive cooling lower down in the casing. To this end, instead of having all of the reverse flow of air return through conduits each having a single communication with the coil, the connection 51' has a suitably valve controlled connection with the coil at 60 and a further higher connection with an extension 61 of the coil, made up and arranged similarly to its lower portions, at the point 62, this point connected through a conduit 51'' with the conduit 51' beyond a valve 63 in the connection 60. In like manner connections 52' and 52'' are provided. It will be understood that the valves 50 will be set to provide a higher resistance to flow than the valves 63 provide, and the latter will provide a back pressure sufficiently in excess of the resistance to flow imposed by the additional coil sections 61 to cause the desired flow through the latter.

The advantages of this embodiment of the invention will be readily appreciated, as the depositing out of the water and $CO_2$ will be carried still higher up in the accumulators and a still more effective cooling of the air will be accomplished, with the results that no $CO_2$ or water vapor will pass through the accumulators and there will be more effective and complete sublimation of the deposits thereof. It will be evident that this arrangement with two exits, at different points along the accumulator for reversely flowing air is but illustrative and that more return connections, and an even more complete, but graduated supplemental cooling may be provided if desired.

It will be understood that the apparatus shown in Figs. 1 and 4 might be inverted so that the warm compressed air will enter at the bottom and when cooled emerge at the top. In case one or more of the condensable impurities separates out in liquid form it would be definitely advantageous to invert the accumulators, and such an inverted construction would be employed so as to enable the liquid to trickle down to the warmer end and be drained off instead of having an opportunity to collect and freeze in the colder end. If there are no difficulties from liquid impurities, the arrangements shown present the advantage of stability with respect to undesirable convection.

While there are in this application specifically described two forms which the invention may assume in practice, it will be understood that these forms of the same are shown for purposes of illustration, and that the invention may be modified and embodied in various other forms without departing from its spirit or the scope of the appended claims.

What I claim as new and desire to secure by Letters Patent is:

1. In combination, in an accumulator, a casing, a metallic packing of high heat capacity therein, a supply connection at one end of said casing and a discharge connection at the other end thereof for a warm fluid to be treated, a supply connection at the last mentioned end of said casing and a discharge at its first mentioned end for a cold fluid, and a coil in said casing having portions at the end thereof with which said supply connection for a cold fluid communicates and also in spaced relation to said end, said coil having means at said last mentioned end of said casing for the admission of a fraction of said first mentioned fluid after it has traversed said casing, and said coil having mutually spaced discharge connections disposed at points differently spaced longitudinally from the end of said casing at which admission of the fraction of said first mentioned fluid occurs.

2. In combination, in an accumulator, a casing having a cold end and a warm end and having therein a packing and a tubing, said tubing having convolutions extending for a substantial portion of the length of said casing and having an open end communicating with the cold end of said accumulator and having a plurality of discharges differently spaced from said cold end, conduit and valve means for conducting a warm gaseous mixture to the warm end of said casing, conduit and valve means for conducting to said casing, to the cold end of the latter, when its warm end is not receiving the warm gaseous mixture, a cold constituent of said mixture, conduit and valve means for discharging from the warm end of said casing the warmed cold constituent supplied to its other end, and conduit and valve means for discharging portions of said mixture not deposited in said casing including conduits communicating severally with the discharges of said convolutions, a conduit communicating with the cold end of said casing, and means for producing a sufficient resistance to flow through said last mentioned conduit and some of the conduits communicating with the discharges from said convolutions to cause flow through said convolutions and each of said conduits communicating with the discharges thereof.

3. In combination, in an accumulator, a casing, a metallic packing of high heat capacity therein, a supply connection at one end of said casing and a discharge connection at the other end thereof for a cold fluid, a supply connection at the last mentioned end of the casing and a discharge at its first mentioned end for a warm fluid to be treated, a hollow heat exchanger in said casing extending throughout a substantial portion of the length of the latter and having its interior connected with the interior of said casing at the end of the latter at which the supply connection for a cold fluid is, a plurality of discharges from the interior of said heat exchanger to points outside said accumulator, said discharges communicating with said heat exchanger at points spaced different distances from the last mentioned end of said casing, and means for controlling the flow of fluid in said accumulator and in said heat exchanger including means for proportioning the flow of fluid from said heat exchanger between said plurality of discharges.

SAMUEL CORNETTE COLLINS.

REFERENCES CITED

The following references are of record in the file of this patent:

UNITED STATES PATENTS

| Number | Name | Date |
| --- | --- | --- |
| 2,002,941 | Frankl | May 28, 1935 |
| 2,283,232 | Schuftan | May 19, 1942 |
| 2,355,660 | Le Rouge | Aug. 15, 1944 |
| 2,460,859 | Trumpler | Feb. 8, 1949 |